(12) United States Patent
Kobayashi et al.

(10) Patent No.: US 10,808,586 B2
(45) Date of Patent: *Oct. 20, 2020

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi (JP)

(72) Inventors: Hiroshi Kobayashi, Numazu (JP); Toshihiro Mori, Gotemba (JP); Daichi Imai, Sunto-gun (JP); Keiichiro Aoki, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,012

(22) Filed: Dec. 5, 2018

(65) Prior Publication Data

US 2019/0195103 A1    Jun. 27, 2019

(30) Foreign Application Priority Data

Dec. 27, 2017    (JP) .................................. 2017-251337

(51) Int. Cl.
*F01N 3/08*    (2006.01)
*F02D 41/02*    (2006.01)
(Continued)

(52) U.S. Cl.
CPC ....... *F01N 3/0814* (2013.01); *B01D 53/9495* (2013.01); *B60W 10/06* (2013.01);
(Continued)

(58) Field of Classification Search
CPC .. F01N 3/0814; F01N 3/0871; F01N 2430/06; F01N 2900/1602;
(Continued)

(56) References Cited

U.S. PATENT DOCUMENTS

| 6,038,853 | A  | * | 3/2000 | Penetrante | ........... | B01D 53/323 60/274 |
| 9,010,090 | B2 | * | 4/2015 | Bisaiji | ................... | F01N 3/2073 60/286 |

(Continued)

FOREIGN PATENT DOCUMENTS

| EP | 3 073 078 A2 | 9/2016 |
| JP | 2005-163590 | 6/2005 |
| JP | 2016-186239 | 10/2016 |

OTHER PUBLICATIONS

Notice of Allowance dated Mar. 18, 2020 in co-pending U.S. Appl. No. 16/210,009.

(Continued)

*Primary Examiner* — Matthew T Largi
(74) *Attorney, Agent, or Firm* — Oblon, McClelland, Maier & Neustadt, L.L.P.

(57) ABSTRACT

Rich spike is carried out in an efficient manner. In an exhaust gas purification apparatus for an internal combustion engine which performs lean burn operation, the apparatus includes an NOx storage reduction catalyst, a controller to carry out rich spike, to calculate a storage amount of NOx, to calculate a storage amount of nitrates, and calculate a nitrate ratio, wherein the controller controls a timing at which the rich spike is carried out, based on the nitrate ratio.

4 Claims, 14 Drawing Sheets

(51) Int. Cl.
*B01D 53/94* (2006.01)
*B60W 10/06* (2006.01)

(52) U.S. Cl.
CPC ....... *F01N 3/0871* (2013.01); *F02D 41/0275* (2013.01); *F01N 3/0835* (2013.01); *F01N 3/0842* (2013.01); *F01N 3/0857* (2013.01); *F01N 2250/12* (2013.01); *F01N 2430/06* (2013.01); *F01N 2560/025* (2013.01); *F01N 2560/026* (2013.01); *F01N 2560/06* (2013.01); *F01N 2900/1402* (2013.01); *F01N 2900/1602* (2013.01); *F01N 2900/1614* (2013.01); *F01N 2900/1621* (2013.01); *F02D 2200/0806* (2013.01); *F02D 2200/0808* (2013.01); *F02D 2200/0811* (2013.01)

(58) Field of Classification Search
CPC ......... F01N 2900/1621; F01N 2560/06; F01N 2560/025; F01N 2900/1614; F01N 2560/026; F01N 2900/1402; F01N 2250/12; F01N 3/0857; F01N 3/0842; F01N 3/0835; F02D 41/0275; F02D 2200/0806; F02D 2200/0808; F02D 2200/0811; B60W 10/06; B01D 53/9495; B01D 53/9431; B01D 2258/012; B01D 2257/404; B01D 53/9422

See application file for complete search history.

(56) References Cited

U.S. PATENT DOCUMENTS

| | | | |
|---|---|---|---|
| 2003/0114300 A1* | 6/2003 | Twigg | B01D 53/944 502/20 |
| 2006/0137328 A1* | 6/2006 | Takeshima | B01D 53/9431 60/286 |
| 2013/0259778 A1* | 10/2013 | Doering | B01D 53/9409 423/212 |
| 2019/0195101 A1* | 6/2019 | Imai | F01N 9/00 |
| 2019/0195102 A1* | 6/2019 | Imai | B01D 53/9495 |

OTHER PUBLICATIONS

Notice of Allowance dated Mar. 18, 2020 in co-pending U.S. Appl. No. 16/207,891.

* cited by examiner

| MODE | TEMPERATURE AT THE TIME OF STORAGE | TEMPERATURE AT THE TIME OF REDUCTION |
|---|---|---|
| 1 | 200°C | 300°C |
| 2 | 300°C | 300°C |
| 3 | 200°C | 200°C |
| 4 | 300°C | 200°C |

EXHAUST GAS PURIFICATION APPARATUS FOR AN INTERNAL COMBUSTION ENGINE

This application claims the benefit of Japanese Patent Application No. 2017-251337, filed on Dec. 27, 2017, which is hereby incorporated by reference herein in its entirety.

BACKGROUND

Technical Field

The present disclosure relates to an exhaust gas purification apparatus for an internal combustion engine.

Description of the Related Art

There has been known a technique in which an NOx storage reduction catalyst (hereinafter, sometimes also referred to as an "NSR catalyst") is arranged as an exhaust gas purification catalyst in an exhaust passage of an internal combustion engine which performs lean burn operation in which an air fuel ratio of a mixture is adjusted to a lean air fuel ratio higher than a stoichiometric air fuel ratio. The NSR catalyst has a function to store NOx in exhaust gas when the air fuel ratio of its ambient atmosphere is a lean air fuel ratio, as well as to reduce the NOx thus stored when the air fuel ratio of the ambient atmosphere is a rich air fuel ratio lower than the stoichiometric air fuel ratio and when a reducing agent exists. Here, note that in this description, the term "storage" is used as such including a mode of "adsorption".

Then, in the internal combustion engine which is provided with such an NSR catalyst, the NOx stored in the NSR catalyst is reduced by the execution of rich spike which temporarily changes the air fuel ratio of the exhaust gas from a lean air fuel ratio higher than the stoichiometric air fuel ratio to a rich air fuel ratio lower than the stoichiometric air fuel ratio.

In patent literature 1, there is disclosed a technique in which rich spike is carried out when an amount of NOx trapped by an NOx trap catalyst reaches a predetermined amount.

In addition, in patent literature 2, there is disclosed a technology in which in an exhaust gas purification control device which carries out a rich spike operation in cases where an amount of NOx stored into an NSR catalyst exceeds a first threshold value, when the storage amount of NOx exceeds a second threshold value larger than the first threshold value, the rich spike operation is started at an air fuel ratio of the exhaust gas leaner than in the case where the storage amount of NOx is equal to or less than the second threshold value.

CITATION LIST

Patent Literature

Patent Literature 1: Japanese patent application laid-open publication No. 2005-163590
Patent Literature 2: Japanese patent application laid-open publication No. 2016-186239

SUMMARY

In the past, there has been known a technique in which rich spike is carried out based on an amount of NOx stored in an NSR catalyst (a storage amount of NOx). However, it has been found that even if the rich spike is carried out based on the storage amount of NOx, there is a fear that the NOx stored in the NSR catalyst can not be reduced to a sufficient extent. Specifically, even if the storage amount of NOx and the temperature of the NSR catalyst at the time when the rich spike is carried out are the same, the reduction efficiency of NOx at the time of the execution of the rich spike (i.e., the ratio of the amount of NOx reduced by the execution of the rich spike with respect to the storage amount of NOx before the execution of the rich spike) may change. Then, in a state where the above-mentioned reduction efficiency has become low, the NOx stored in the NSR catalyst can not be reduced to a sufficient extent. Moreover, it has also been newly found that such a situation occurs resulting from the storage mode of NOx in the NSR catalyst.

The present disclosure has been made in view of the above-mentioned problems, and has for its object to provide a technique in which rich spike for reducing NOx stored in an NSR catalyst can be carried out in an efficient manner.

The present disclosure is directed to an exhaust gas purification apparatus for an internal combustion engine which performs lean burn operation, the apparatus may comprising: an NOx storage reduction catalyst that is arranged in an exhaust passage of the internal combustion engine; and a controller comprising at least one processor is configured to carry out rich spike to temporarily change an air fuel ratio of exhaust gas flowing into the NOx storage reduction catalyst from a lean air fuel ratio higher than a stoichiometric air fuel ratio into a rich air fuel ratio lower than the stoichiometric air fuel ratio.

In such an exhaust gas purification apparatus, most of the NOx discharged from the internal combustion engine may be stored in the NOx storage reduction catalyst (hereinafter, sometimes also referred to as an "NSR catalyst"). Here, as a result of an earnest study, the present inventor has newly considered the following mechanism estimated for an NOx storage mechanism in the NSR catalyst.

The NSR catalyst is constructed in such a manner that a precious metal catalyst such as Pt, etc., and an occlusion or storage material such as Ba, etc., are supported by a carrier such as alumina, etc. Then, the NOx, which has been made to react with oxygen by the precious metal catalyst for promoting the reaction of NOx and oxygen, is stored in the storage material. Here, according to the estimated mechanism newly considered, in cases where the temperature of the NSR catalyst is relatively low, the NOx having flowed into the NSR catalyst tends to mainly turn into nitrites which are then stored in the storage material. On the other hand, in cases where the temperature of the NSR catalyst is relatively high, the NOx having flowed into the NSR catalyst tends to once turn into nitrites which are then stored in the storage material, and further, a part (or all) of the nitrites tends to turn into nitrates which are then stored in the storage material. In other words, the storage mode of the NOx already stored in the storage material may further change according to a change in the temperature of the NSR catalyst after the storage of the NOx. Thus, the storage mode of the NOx in the NSR catalyst changes according to the temperature of the NSR catalyst. Here, note that in the following explanation, "the NOx stored in the NSR catalyst" contains nitrates and nitrites.

Then, it has been found that the nitrates stored in the storage material are stored in the storage material by a relatively weak adsorption force, but in contrast to this, the nitrites stored in the storage material are stored in the storage material by an adsorption force stronger than that by which the nitrites are stored in the storage material. Accordingly, when reducing the NOx stored in the NSR catalyst by the rich spike, the nitrates stored in the NSR catalyst become harder to be reduced than the nitrites stored in the NSR catalyst.

In view of the above, when a ratio of the amount of the nitrates stored in the NSR catalyst (hereinafter, sometimes referred to as a "storage amount of nitrates") with respect to the amount of the NOx stored in the NSR catalyst (hereinafter, sometimes referred to as a "storage amount of NOx") is defined as a nitrate ratio, and when a ratio of the amount of NOx reduced by the execution of the rich spike with respect to the storage amount of NOx before the execution of the rich spike is defined as an NOx reduction efficiency, there is a tendency that the higher the nitrate ratio, the lower the NOx reduction efficiency becomes. Accordingly, even if the storage amount of NOx is the same, in the case where the rich spike is carried out in a state where the nitrate ratio is high, the NOx reduction efficiency tends to become lower in comparison with the case where the rich spike is carried out in a state where the nitrate ratio is low. For that reason, there is a fear that the NOx stored in the NSR catalyst (in particular, the nitrates stored in the NSR catalyst) can not be reduced to a sufficient extent.

Accordingly, in the exhaust gas purification apparatus for an internal combustion engine according to the present disclosure, the controller may calculate the storage amount of NOx and the storage amount of nitrates. Further, the controller may calculate the nitrate ratio based on the storage amount of NOx and the storage amount of nitrates. Then, the controller may control a timing at which the rich spike is carried out, based on the nitrate ratio.

In such an exhaust gas purification apparatus, the controller can carry out the rich spike by advancing the timing, before the NOx reduction efficiency at the time of carrying out the rich spike decreases because the nitrate ratio becomes high. In other words, even if the storage amount of NOx is the same, the rich spike can be carried out by advancing the timing more in the case where the nitrate ratio is high, than in the case where it is low. This makes it possible to carry out the rich spike in an efficient manner.

Here, according to the NOx storage mechanism as mentioned above, the NOx flowing into the NSR catalyst and being able to be stored in the NSR catalyst (i.e., most of the NOx discharged from the internal combustion engine can be stored in the NSR catalyst, as mentioned above, but in the case where the flow rate of exhaust gas is relatively large, etc., for example, a certain amount of the NOx discharged from the internal combustion engine may flow out from the NSR catalyst, without being stored in the NSR catalyst.) turns into nitrites or nitrates in the NSR catalyst, which are then stored into the NSR catalyst. Accordingly, the storage amount of NOx is the amount of nitrites and nitrates stored in the NSR catalyst. Then, a part of this storage amount of NOx becomes the storage amount of nitrates. Thus, the storage amount of nitrates will change according to the storage amount of NOx.

In addition, as mentioned above, the NOx having flowed into the NSR catalyst is caused to react with oxygen, whereby the NOx can turn into nitrites, and further can turn into nitrates. In other words, the amount of nitrates to be produced may change according to an oxygen concentration of the exhaust gas flowing into the NSR catalyst. Accordingly, the storage amount of nitrates will change according to the oxygen concentration of the exhaust gas flowing into the NSR catalyst.

Moreover, as described above, whether the NOx having flowed into the NSR catalyst becomes easy to turn into nitrites and to be stored in the NSR catalyst, or it becomes easy to further turn from nitrites into nitrates and to be stored in the NSR catalyst, changes according to the temperature of the NSR catalyst. Accordingly, the storage amount of nitrates will change according to the temperature of the NSR catalyst.

In view of the above, the storage amount of nitrates can be calculated based on the storage amount of NOx, the temperature of the NSR catalyst, and the oxygen concentration of the exhaust gas flowing into the NSR catalyst. Accordingly, the controller may calculate the storage amount of nitrates based on the storage amount of NOx, the temperature of the NOx storage reduction catalyst, and the oxygen concentration of the exhaust gas flowing into the NOx storage reduction catalyst. With this, the storage amount of nitrates can be calculated in an appropriate manner, thus making it possible to carry out the rich spike in an efficient manner.

Here, in the past, the rich spike has been carried out when the storage amount of NOx reaches a predetermined reference amount. However, in the past, it has been unknown that the NOx reduction efficiency changes according to the nitrate ratio. Then, after the nitrate ratio has become high and the NOx reduction efficiency has decreased, even if the rich spike is carried out when the storage amount of NOx reaches the predetermined reference amount, there is a fear that the NOx stored in the NSR catalyst can not be reduced to a sufficient extent.

Accordingly, the controller may carry out the rich spike, when the storage amount of NOx reaches the predetermined reference amount, and may further carry out the rich spike by changing the predetermined reference amount in such a manner that the predetermined reference amount becomes smaller in the case where the nitrate ratio is high than in the case where it is low. In that case, the execution timing of the rich spike is advanced more in the case where the nitrate ratio is high than in the case where it is low. This makes it possible to carry out the rich spike in an efficient manner.

In addition, in the exhaust gas purification apparatus for an internal combustion engine according to the present disclosure: the controller may calculate the NOx reduction efficiency without depending on the execution of the rich spike, and the controller may calculate the NOx reduction efficiency based on the nitrate ratio, the temperature of the NOx storage reduction catalyst, and the storage amount of NOx. Then, the controller may calculate the NOx reduction efficiency in such a manner that the NOx reduction efficiency becomes lower as the nitrate ratio becomes higher, and that the NOx reduction efficiency becomes lower as the storage amount of NOx becomes larger, and that the NOx reduction efficiency becomes higher in the case where the temperature of the NOx storage reduction catalyst falls within a predetermined temperature range than in the case where the temperature does not fall within the range. The controller may carry out the rich spike, before the NOx reduction efficiency becomes lower than a predetermined reference efficiency.

Here, the nitrate ratio, the temperature of the NOx storage reduction catalyst and the storage amount of NOx each have a correlation with the NOx reduction efficiency. Specifically, the higher the nitrate ratio, the lower the NOx reduction efficiency becomes. In addition, the larger the storage amount of NOx, the lower the NOx reduction efficiency becomes. Moreover, the NOx reduction efficiency becomes higher in the case where the temperature of the NOx storage reduction catalyst falls within the predetermined temperature range than in the case where the temperature does not fall within the range. Accordingly, the NOx reduction efficiency in the case of carrying out the rich spike can be estimated based on these correlations, before the execution of the rich spike. Thus, the controller may calculate the NOx reduction efficiency based on these correlations, without depending on the execution of the rich spike. Then, when the rich spike is actually carried out before the NOx reduction efficiency calculated in this manner becomes lower than the predetermined reference efficiency, the NOx stored in the NSR catalyst becomes easier to be reduced by the rich spike, in comparison with the case when the NOx reduction efficiency is lower than the predetermined reference efficiency. In other words, it is possible to carry out the rich spike in an efficient manner.

According to the present disclosure, rich spike for reducing NOx stored in an NSR catalyst can be carried out in an efficient manner.

DESCRIPTION OF THE EMBODIMENTS

Hereinafter, modes (or embodiments) for carrying out the present invention will be described in detail by way of example with reference to the attached drawings. However, the dimensions, materials, shapes, relative arrangements and so on of component parts described in the embodiments are not intended to limit the scope of the present invention to these alone in particular as long as there are no specific statements.

First Embodiment

<Construction of Intake System and Exhaust System of Internal Combustion Engine>

Figure 1:
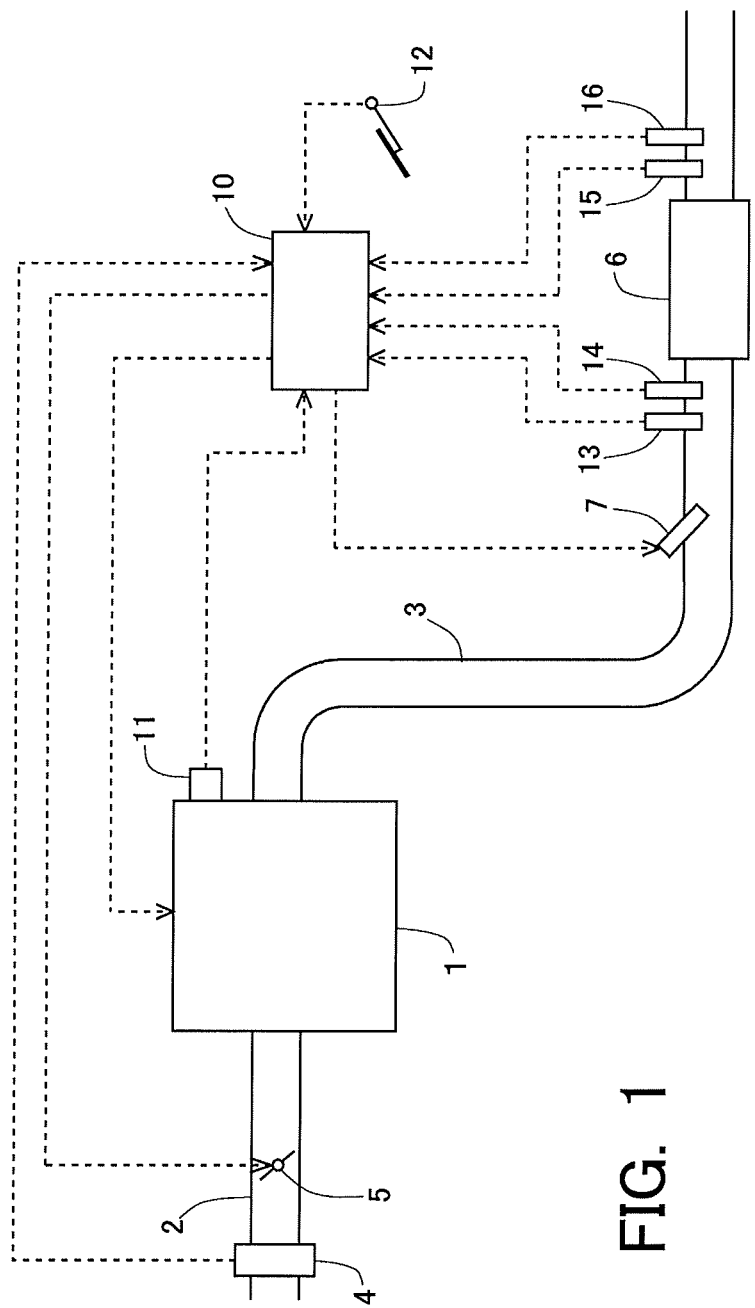
FIG. 1 is a view indicating the schematic construction of an intake system and an exhaust system of an internal combustion engine.

FIG. 1 is a view indicating the schematic construction of an intake system and an exhaust system of an internal combustion engine according to a first embodiment. The internal combustion engine 1 indicated in FIG. 1 is an internal combustion engine of compression ignition type (diesel engine). However, the present invention can also be applied to a lean burn internal combustion engine of spark ignition type which uses gasoline or the like as fuel.

An intake passage 2 and an exhaust passage 3 are connected to the internal combustion engine 1. An air flow meter 4 is arranged in the intake passage 2. The air flow meter 4 serves to detect an amount of intake air sucked into the internal combustion engine 1. Also, a throttle valve 5 is arranged in the intake passage 2 at the downstream side of the air flow meter 4. The throttle valve 5 serves to control the amount of intake air in the internal combustion engine 1 by changing the channel cross section of the intake passage 2.

In the exhaust passage 3, there is arranged an NOx storage reduction catalyst 6 (hereinafter, sometimes also referred to as an NSR catalyst 6) as an exhaust gas purification catalyst. Here, note that in the exhaust passage 3, there may be arranged an NOx selective catalytic reduction catalyst and/or a particulate filter, in addition to the NSR catalyst 6. A fuel addition valve 7 is arranged in the exhaust passage 3 at the upstream side of the NSR catalyst 6. The fuel addition valve 7 serves to add fuel into exhaust gas. The fuel added from the fuel addition valve 7 is supplied to the NSR catalyst 6 along with the exhaust gas.

In addition, an upstream side NOx sensor 13 and an air fuel ratio sensor 14 are arranged in the exhaust passage 3 at the downstream side of the fuel addition valve 7 and at the upstream side of the NSR catalyst 6. The upstream side NOx sensor 13 detects the concentration of NOx in the exhaust gas flowing into the NSR catalyst 6 (hereinafter, sometimes also referred to as an "incoming exhaust gas"). The air fuel ratio sensor 14 detects the air fuel ratio of the incoming exhaust gas. Moreover, a downstream side NOx sensor 15 and a temperature sensor 16 are arranged in the exhaust passage 3 at the downstream side of the NSR catalyst 6. The downstream side NOx sensor 15 detects the concentration of NOx in the exhaust gas flowing out from the NSR catalyst 6 (hereinafter, sometimes also referred to as an "outgoing exhaust gas"). The temperature sensor 16 detects the temperature of the outgoing exhaust gas.

In the internal combustion engine 1, there is arranged in combination therewith an electronic control unit (ECU) 10 for controlling the internal combustion engine 1. The air flow meter 4, the upstream side NOx sensor 13, the air fuel ratio sensor 14, the downstream side NOx sensor 15 and the temperature sensor 16 are electrically connected to the ECU 10. Further, a crank angle sensor 11 and an accelerator opening sensor 12 are electrically connected to the ECU 10. The crank angle sensor 11 outputs a signal having a correlation with a crank angle of the internal combustion engine 1. The accelerator opening sensor 12 outputs a signal having a correlation with an opening degree of an accelerator of a vehicle on which the internal combustion engine 1 is mounted.

Then, output values or signals of these individual sensors are inputted to the ECU 10. The ECU 10 derives the rotation speed of the internal combustion engine 1 based on the output value of the crank angle sensor 11. Also, the ECU 10 derives the engine load of the internal combustion engine 1 based on the output value of the accelerator opening sensor 12. In addition, the ECU 10 estimates the flow rate of the exhaust gas (hereinafter, sometimes also referred to as an "exhaust gas flow rate") based on the output value of the air flow meter 4, and calculates the flow rate of NOx flowing into the NSR catalyst 6 (hereinafter, sometimes also referred to as an "NOx incoming flow rate") based on the exhaust gas flow rate and the output value of the upstream side NOx sensor 13, and calculates the flow rate of NOx flowing out from the NSR catalyst 6 (hereinafter, sometimes also referred to as an "NOx outgoing flow rate") based on the exhaust gas flow rate and the output value of the downstream side NOx sensor 15. Moreover, the ECU 10 estimates the temperature of the NSR catalyst 6 (hereinafter, sometimes also referred to as a "catalyst temperature") based on the output value of the temperature sensor 16.

Further, fuel injection valves (illustration omitted) of the internal combustion engine 1, the throttle valve 5 and the fuel addition valve 7 are electrically connected to the ECU 10. Thus, these parts are controlled by the ECU 10. Here, the ECU 10 carries out processing to temporarily change the air fuel ratio of the exhaust gas flowing into the NSR catalyst 6 from a lean air fuel ratio higher than a stoichiometric air fuel ratio into a rich air fuel ratio lower than the stoichiometric air fuel ratio (hereinafter, sometimes also referred to as "rich spike processing". In this embodiment, the ECU 10 carries out the rich spike processing by adding fuel into the exhaust gas discharged from the internal combustion engine 1 with the use of the fuel addition valve 7. However, in this embodiment, there is no intention limited to such a case, and the ECU 10 can carry out the rich spike processing by using well-known techniques. For example, the ECU 10 may carry out the rich spike processing by forming a rich mixture in a cylinder using a fuel injection valve (illustration omitted) of the internal combustion engine 1, and by combusting the rich mixture in the cylinder.

<Storage & Reduction Mechanism of NOx in the NSR Catalyst>

When the rich spike processing is carried out, a reducing agent such as HC, CO, etc., is supplied to the NSR catalyst 6. Then, the NOx stored in the NSR catalyst 6 (hereinafter, sometimes also referred to as the "stored NOx") is reduced by this reducing agent. For example, in cases where the rich spike processing is carried out by the addition of fuel from the fuel addition valve 7, the stored NOx is mainly reduced by HC. In addition, for example, in cases where the rich spike processing is carried out by the combustion of a rich mixture in a cylinder, the stored NOx is mainly reduced by CO and HC.

Then, in the past, there has been known a technique in which rich spike processing is carried out when an amount of stored NOx reaches a predetermined amount, but in this case, it has been found that a situation may occur where the stored NOx can not be reduced to a sufficient extent. This will be explained below in detail.

Figure 2:
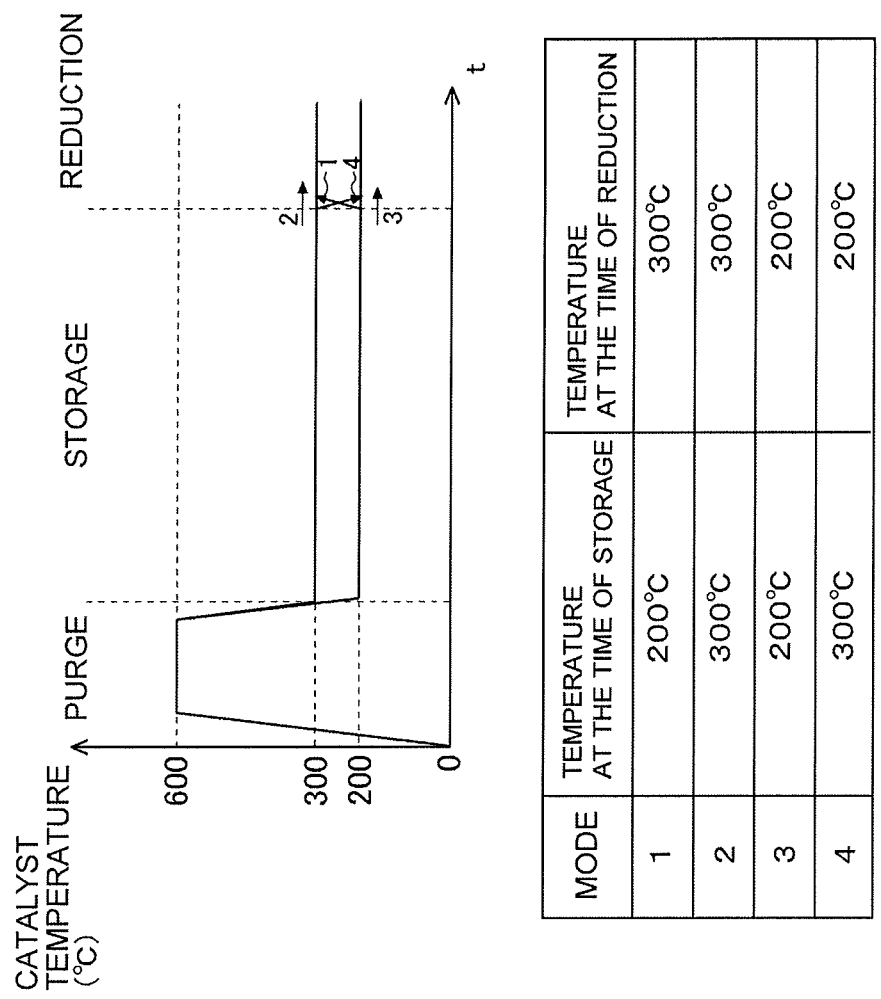
FIG. 2 is a view indicating how to cause a catalyst temperature to change over time when testing the influence of the catalyst temperature on the reduction of NOx in an NSR catalyst.

FIG. 2 is a view indicating how to cause the catalyst temperature to change over time when testing the influence of the temperature of the NSR catalyst 6 (the catalyst temperature) on the reduction of NOx in the NSR catalyst 6. In the tests indicated in FIG. 2, the stored NOx is first purged at high temperature. That is, the stored NOx is released from the NSR catalyst 6. Subsequently, NOx is supplied to the NSR catalyst 6 so that it is stored in the NSR catalyst 6. Thereafter, the stored NOx is reduced by the reducing agent which is supplied to the NSR catalyst 6. Then, the tests indicated in FIG. 2 have four test modes (i.e., from mode 1 to mode 4). In the mode 1, the catalyst temperature at the time of storage is made at 200 degrees C., and the catalyst temperature at the time of reduction is made at 300 degrees C. In the mode 2, the catalyst temperatures at the time of storage and reduction are made at 300 degrees C. In the mode 3, the catalyst temperatures at the time of storage and reduction are made at 200 degrees C. In the mode 4, the catalyst temperature at the time of storage is made at 300 degrees C., and the catalyst temperature at the time of reduction is made at 200 degrees C.

Figure 3:
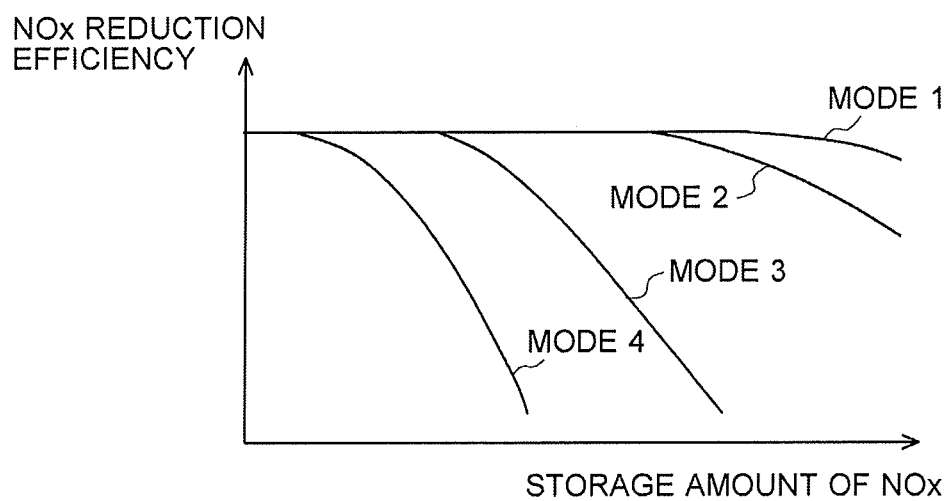
FIG. 3 is a view indicating a correlation between a storage amount of NOx and an NOx reduction efficiency when tests in mode 1 through mode 4 indicated in FIG. 2 are carried out.

Then, FIG. 3 is a view indicating a correlation between an amount of the NOx stored in the NSR catalyst 6 (the stored NOx) (hereinafter, sometimes also referred to as a "storage amount of NOx") at the time when the tests in the mode 1 through the mode 4 indicated in FIG. 2, and a ratio of the amount of NOx reduced by the execution of the rich spike processing with respect to the storage amount of NOx before the execution of the rich spike processing (hereinafter, sometimes also referred to as an "NOx reduction efficiency"). As indicated in FIG. 3, in any mode, the larger the storage amount of NOx before the execution of the rich spike processing, the lower the NOx reduction efficiency becomes. In addition, in FIG. 3, the influence of the catalyst temperature at the time of reduction is grasped by making a comparison between the above-mentioned correlation in the mode 1 and the above-mentioned correlation in the mode 3, or by making a comparison between the above-mentioned correlation in the mode 2 and the above-mentioned correlation in the mode 4. According to this, it is found that when the storage amount of NOx is the same, the NOx reduction efficiency becomes higher in the case where the catalyst temperature at the time of reduction is high than in the case where it is low. Also, in FIG. 3, the influence of the catalyst temperature at the time of storage is grasped by making a comparison between the above-mentioned correlation in the mode 1 and the above-mentioned correlation in the mode 2, or by making a comparison between the above-mentioned correlation in the mode 3 and the above-mentioned correlation in the mode 4. According to this, it is found that when the storage amount of NOx is the same, the NOx reduction efficiency becomes lower in the case where the catalyst temperature at the time of storage is high than in the case where it is low.

In this manner, even if the storage amount of NOx before the execution of the rich spike processing is the same, the NOx reduction efficiency changes to a large extent with the catalyst temperature at the time of storage of NOx or at the time of reduction of NOx. For that reason, in the conventional technique in which the rich spike processing is carried out when the storage amount of NOx reaches the predetermined amount, there may occur a situation where the stored NOx can not be sufficiently reduced, depending on the catalyst temperature at the time of storage of NOx or at the time of reduction of NOx. Then, as a result of an earnest study, the present inventor has found out that the situation where the NOx reduction efficiency changes with the catalyst temperature at the time of storage or at the time of reduction occurs, resulting from the storage mode of the NOx in the NSR catalyst 6. This will be explained below.

A mechanism estimated for an NOx storage mechanism in the NSR catalyst 6, newly considered by the present inventor, will be explained based on FIG. 4A and FIG. 4B. FIG.

Figure 4A:
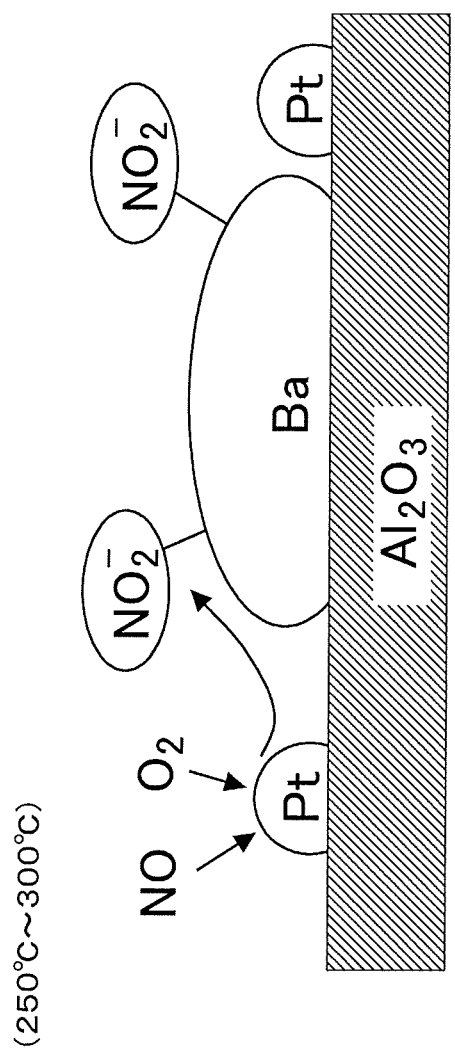
FIG. 4A is a view for explaining a storage mode of NOx in the case where the temperature of the NSR catalyst is relatively low.
Figure 4B:
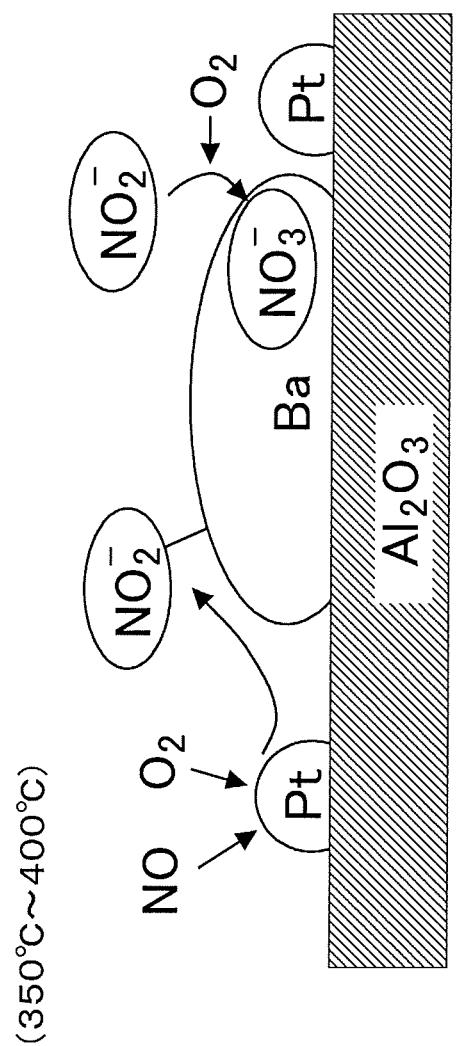
FIG. 4B is a view for explaining a storage mode of NOx in the case where the temperature of the NSR catalyst is relatively high.

4A and FIG. 4B are views for explaining the storage mode of NOx in the NSR catalyst 6.

Here, the storage mode of NOx will be explained by exemplifying a case where in the NSR catalyst 6, there are used alumina ($Al_2O_3$) as a carrier, and Pt as a precious metal catalyst, and Ba as an NOx storage material. In the NSR catalyst 6, NOx, which has been caused to react with oxygen in the presence of Pt which promotes the reaction of NOx and oxygen, is stored in Ba. Here, it has been newly found out that when NOx is stored in Ba, the storage mode thereof changes with the temperature of the NSR catalyst 6.

FIG. 4A is a view for explaining the storage mode of NOx in the case where the temperature of the NSR catalyst 6 is relatively low (e.g., from 250 degrees C. to 300 degrees C.). In an example indicated in FIG. 4A, the NO having flowed into the NSR catalyst 6 is caused to react with oxygen in the presence of Pt. In that case, NO turns into nitrites ($NO_2^-$). Then, the nitrites are stored into Ba by a relatively weak adsorption force.

On the other hand, FIG. 4B is a view for explaining the storage mode of NOx in the case where the temperature of the NSR catalyst 6 is relatively high (e.g., from 350 degrees C. to 400 degrees C.). In an example indicated in FIG. 4B, too, similarly to the example indicated in FIG. 4A, the NO having flowed into the NSR catalyst 6 is caused to react with oxygen in the presence of Pt thereby to generate nitrites ($NO_2^-$), as a result of which the nitrites thus generated are stored into Ba by a relatively weak adsorption force. Here, it has been found out that in cases where the temperature of the NSR catalyst 6 is relatively high, a part (or all) of the nitrites stored in Ba is further caused to react with oxygen thereby to turn into nitrates ($NO_3^-$), which are then stored in Ba by a relatively strong adsorption force. In other words, the storage mode of the NOx already stored in Ba can further change according to a change in the temperature of the NSR catalyst 6 after the storage of the NOx.

Thus, the storage mode of the NOx in the NSR catalyst 6 changes according to the temperature of the NSR catalyst 6. Here, note that the stored NOx (the NOx stored in the NSR catalyst 6) contains nitrates and nitrites as referred to above. Accordingly, the storage amount of NOx is the amount of nitrites and nitrates stored in the NSR catalyst 6.

Figure 5:
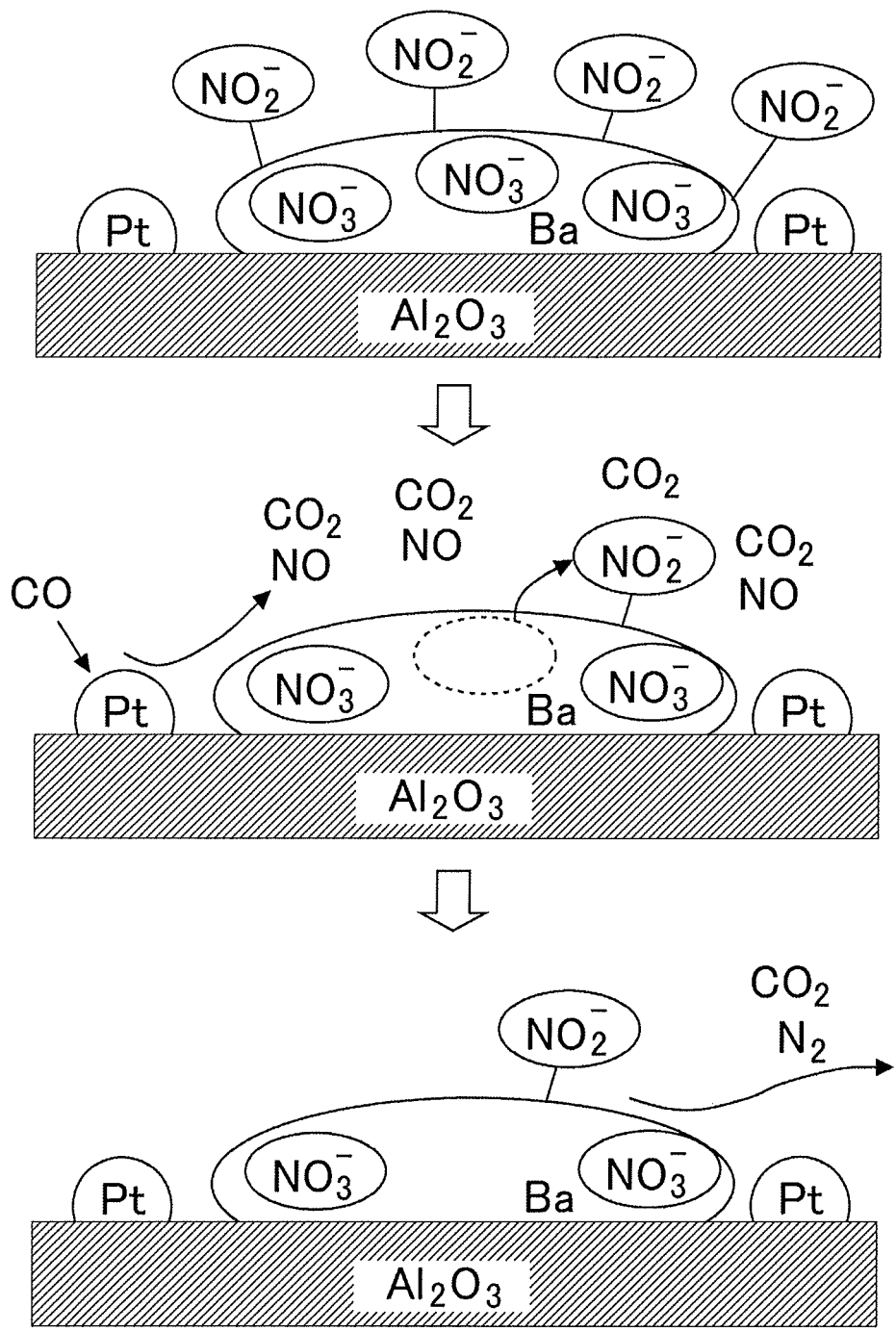
FIG. 5 is a schematic diagram indicating an estimated NOx reduction mechanism in the NSR catalyst.

Then, when the stored NOx is reduced by the execution of the rich spike processing, the nitrates stored in the NSR catalyst 6 become harder to be reduced than the nitrites stored in the NSR catalyst 6. This is illustrated by schematic diagrams indicating the estimated reduction mechanism of NOx in the NSR catalyst 6 at the time of the execution of the rich spike processing indicated in FIG. 5. In FIG. 5, the schematic diagrams in the top, middle and bottom rows represent states before, during and after the execution of the rich spike processing, respectively.

As indicated in the top row of FIG. 5, nitrites and nitrates are stored in the storage material Ba. Then, when CO is supplied as the reducing agent to such an NSR catalyst 6, the nitrites are reduced to NO, as indicated in the middle row of FIG. 5. In addition, a part of the nitrates is reduced to nitrites. Here, as mentioned above, the adsorption force between the nitrites and Ba is relatively weak, so the nitrites stored in Ba can be reduced easily. On the other hand, the adsorption force between the nitrates and Ba is relatively strong, so the nitrates stored in Ba becomes hard to be reduced. As a result, as indicated in the bottom row in FIG. 5, the nitrites having been stored in Ba before the execution of the rich spike processing are reduced up to $N_2$ to desorb from the NSR catalyst 6, but in contrast to this, the nitrates having been stored in Ba before the execution of the rich spike processing may continue to be stored in the NSR catalyst 6, without being reduced at all or without being reduced up to $N_2$ even if reduced.

<Execution Timing of the Rich Spike Processing>

As explained above, the NOx reduction efficiency may change resulting from the storage mode of the NOx in the NSR catalyst 6. Here, the amount of the nitrates stored in the NSR catalyst 6 is defined as a "storage amount of nitrates". Then, the ratio of the storage amount of nitrates with respect to the storage amount of NOx is defined as a nitrate ratio. In that case, there is a tendency that the higher the nitrate ratio, the lower the NOx reduction efficiency becomes. Accordingly, even if the storage amount of NOx is the same, in the case where the rich spike processing is carried out in a state where the nitrate ratio is high, the NOx reduction efficiency tends to become lower in comparison with the case where the rich spike processing is carried out in a state where the nitrate ratio is low. For that reason, there is a fear that the stored NOx can not be reduced to a sufficient extent.

Accordingly, the ECU 10 calculates the above-mentioned nitrate ratio. Then, the ECU 10 controls a timing at which the rich spike processing is carried out, based on the nitrate ratio thus calculated. Here, in this embodiment, the ECU 10 estimates the NOx reduction efficiency in the case of carrying out the rich spike before the execution of the rich spike processing. In other words, the ECU 10 calculates the NOx reduction efficiency without depending on the execution of the rich spike processing. Then, the ECU 10 actually carries out the rich spike processing, before the NOx reduction efficiency calculated without depending on the execution of the rich spike processing becomes lower than a reference efficiency. This makes it possible to carry out the rich spike processing in an efficient manner.

Here, the NOx reduction efficiency has a correlation with each of the nitrate ratio, the temperature of the NOx storage reduction catalyst and the storage amount of NOx. Accordingly, the ECU 10 can calculate the NOx reduction efficiency based on the values of these parameters and the correlations between the parameters and the NOx reduction efficiency.

Figure 6A:
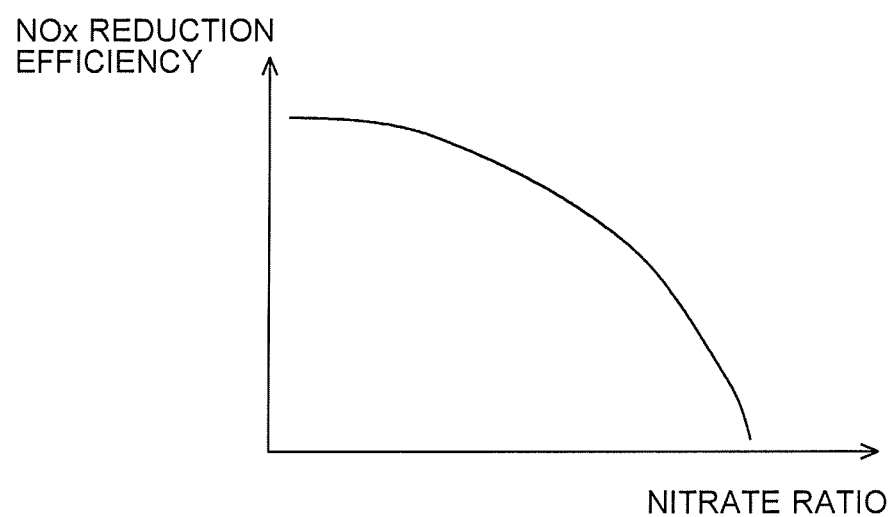
FIG. 6A is a view indicating a correlation between a nitrate ratio and the NOx reduction efficiency.
Figure 6B:
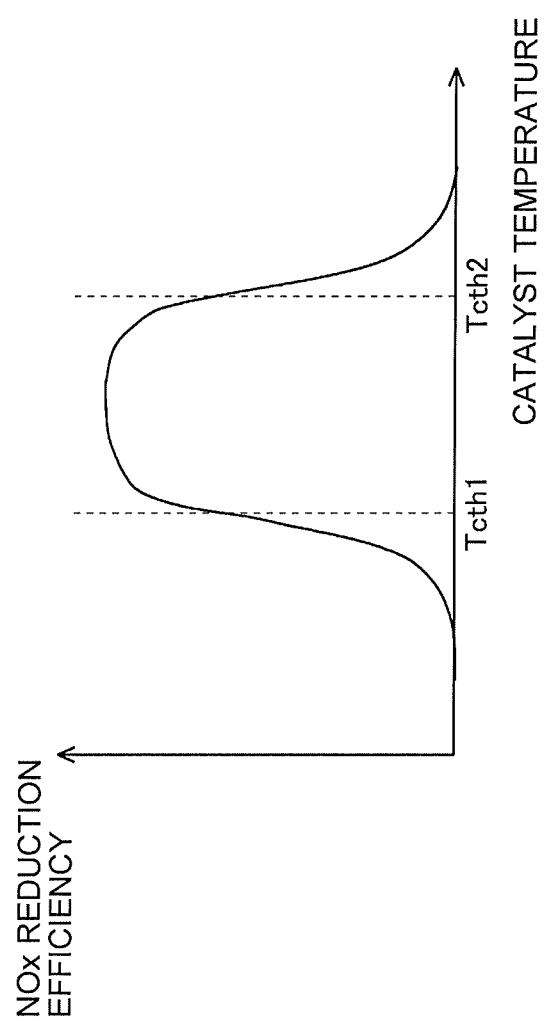
FIG. 6B is a view indicating a correlation between the catalyst temperature and the NOx reduction efficiency.
Figure 6C:
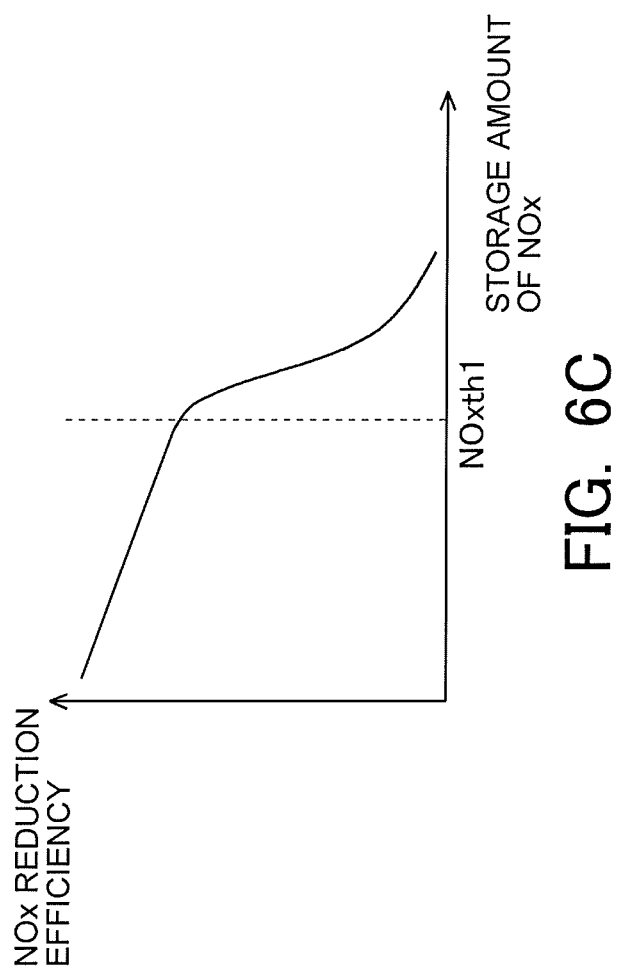
FIG. 6C is a view indicating a correlation between the storage amount of NOx and the NOx reduction efficiency.

Here, note that the above-mentioned correlations are indicated from FIG. 6A to FIG. 6C. FIG. 6A is a view indicating the correlation between the nitrate ratio and the NOx reduction efficiency. As indicated in FIG. 6A, the higher the nitrate ratio, the lower the NOx reduction efficiency becomes. In addition, FIG. 6B is a view indicating the correlation between the catalyst temperature and the NOx reduction efficiency. As indicated in FIG. 6B, the NOx reduction efficiency becomes higher in the case where the catalyst temperature falls within a predetermined temperature range (e.g., a range which is equal to or higher than Tcth1, and is equal to or lower than Tcth2, as indicated in FIG. 6B) than in the case where the catalyst temperature does not fall within the predetermined temperature range. Moreover, FIG. 6C is a view indicating the correlation between the storage amount of NOx and the NOx reduction efficiency. As indicated in FIG. 6C, the larger the storage amount of NOx, the lower the NOx reduction efficiency becomes. In particular, when the storage amount of NOx increases more than a certain amount (e.g., NOxth1 indicated in FIG. 6C), the NOx reduction efficiency decreases to a large extent.

Figure 7:
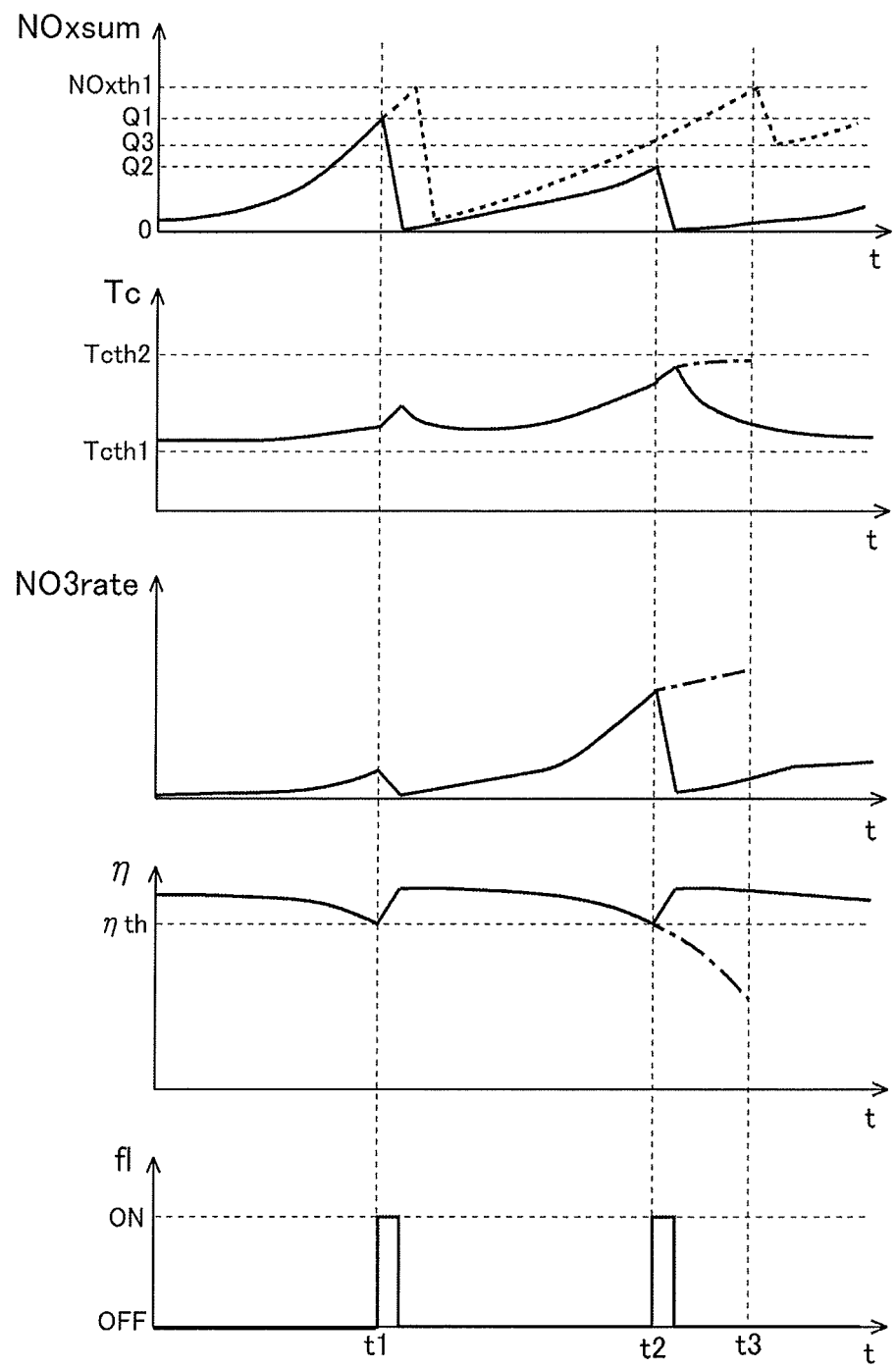
FIG. 7 is a time chart indicating the changes over time of the storage amount of NOx, the catalyst temperature, the nitrate ratio, the NOx reduction efficiency, and an execution flag according to the first embodiment.

Next, brief reference will be made to the control processing executed by the ECU 10 in this embodiment, with the use of a time chart indicated in FIG. 7. FIG. 7 is the time chart indicating the changes over time of the storage amount of NOx NOxsum, the catalyst temperature Tc, the nitrate ratio NO3rate, the NOx reduction efficiency η and an execution flag fl which is a flag indicating whether the rich spike processing is carried out or not. Here, note that in FIG. 7, the above-mentioned changes over time in the case where control based on the present disclosure is carried out are represented by solid lines. Also, in FIG. 7, the change over time of the storage amount of NOx in the case where control based on the conventional technique is carried out is indicated as a reference by a broken line. In addition, in the control based on the present disclosure indicated in FIG. 7, the NOx reduction efficiency decreases in a process in which NOx is stored into the NSR catalyst 6 after the last rich spike processing is carried out, and when the NOx reduction efficiency decreases to the reference efficiency ηth, the current rich spike processing is carried out.

In the control based on the present disclosure indicated in FIG. 7, at a time point t1 and at a time point t2 at which the NOx reduction efficiency becomes the reference efficiency ηth, the execution flag is set to ON, and the rich spike processing is carried out. On the other hand, in the control based on the conventional technique indicated in FIG. 7, when the storage amount of NOx reaches a reference amount NOxth1, the rich spike processing is carried out. Here, the reference amount NOxth1 is a value which corresponds to the above-mentioned storage amount of NOx NOxth1 indicated in FIG. 6C, and which is a threshold value for determining the execution timing of the rich spike processing in the conventional technique.

Then, it is found that in the control based on the present disclosure, even if the storage amount of NOx has not reached the reference amount NOxth1, the rich spike processing is carried out, as indicated in FIG. 7. Specifically, in the control based on the present disclosure, at the time point t1, the storage amount of NOx becomes Q1 which is smaller than the reference amount NOxth1, but at this time, the NOx reduction efficiency becomes the reference efficiency ηth, so the rich spike processing is carried out. Similarly, at the time point t2, the storage amount of NOx becomes Q2 which is smaller than the reference amount NOxth1, but the rich spike processing is carried out. Here, the storage amount of NOx Q2 at the time point t2 is smaller than the storage amount of NOx Q1 at the time point t1. However, the catalyst temperature in a period of time from the time point t1 to the time point t2 is higher than the catalyst temperature before the time point t1. Here, as mentioned above, nitrates tend to be produced more easily in the case where the catalyst temperature is high than in the case where it is low. Accordingly, the nitrate ratio at the time point t2 becomes higher than the nitrate ratio at the time point t1. In other words, at the time point t2, the storage amount of NOx is smaller than that at the time point t1, but the nitrate ratio is higher than that at the time point t1. As a result, at the time point t2, similarly to the time point t1, the NOx reduction efficiency becomes the reference efficiency ηth.

Here, assuming that the nitrate ratio and the NOx reduction efficiency are also calculated in the control based on the conventional technique, too, a comparison is made between the control based on the present disclosure (the rich spike processing at the time point t2) and the control based on the conventional technique (the rich spike processing at a time point t3). Here, note that in FIG. 7, the changes over time of the catalyst temperature, the nitrate ratio and the NOx reduction efficiency in a period of time from the time point t2 to the time point t3 in the control based on the conventional technique are indicated as references by alternate long and short dash lines.

In an example of the control based on the conventional technique indicated in FIG. 7, from the time point t2 to the time point t3, the NOx reduction efficiency decreases, as the storage amount of NOx increases while the nitrate ratio rises. For that reason, at the time point t3 at which the storage amount of NOx reaches the reference amount NOxth1, the NOx reduction efficiency becomes a state where it has decreased to a relatively large extent. Accordingly, even if the rich spike processing is carried out at the time point t3, the stored NOx is not reduced sufficiently, but unreduced NOx remains in the NSR catalyst 6 (this residual amount being a storage amount of NOx Q3 in FIG. 7, for example). In contrast to this, in the control according to the present disclosure, when the rich spike processing is carried out at the time point t2, the storage amount of NOx becomes an amount in the vicinity of zero. In this manner, according to the control according to the present disclosure, the stored NOx can be reduced in an appropriate manner. Moreover, when the execution timing of the rich spike processing is set to a timing at which the NOx reduction efficiency decreases to the reference efficiency ηth after the last rich spike processing is carried out, as indicated in FIG. 7, the frequency of the execution of the rich spike processing to be carried out before the NOx reduction efficiency decreases below the reference efficiency ηth is made as small as possible. In other words, it becomes possible to carry out the rich spike processing at suitable timing, while achieving efficient execution of the rich spike processing.

Figure 8:
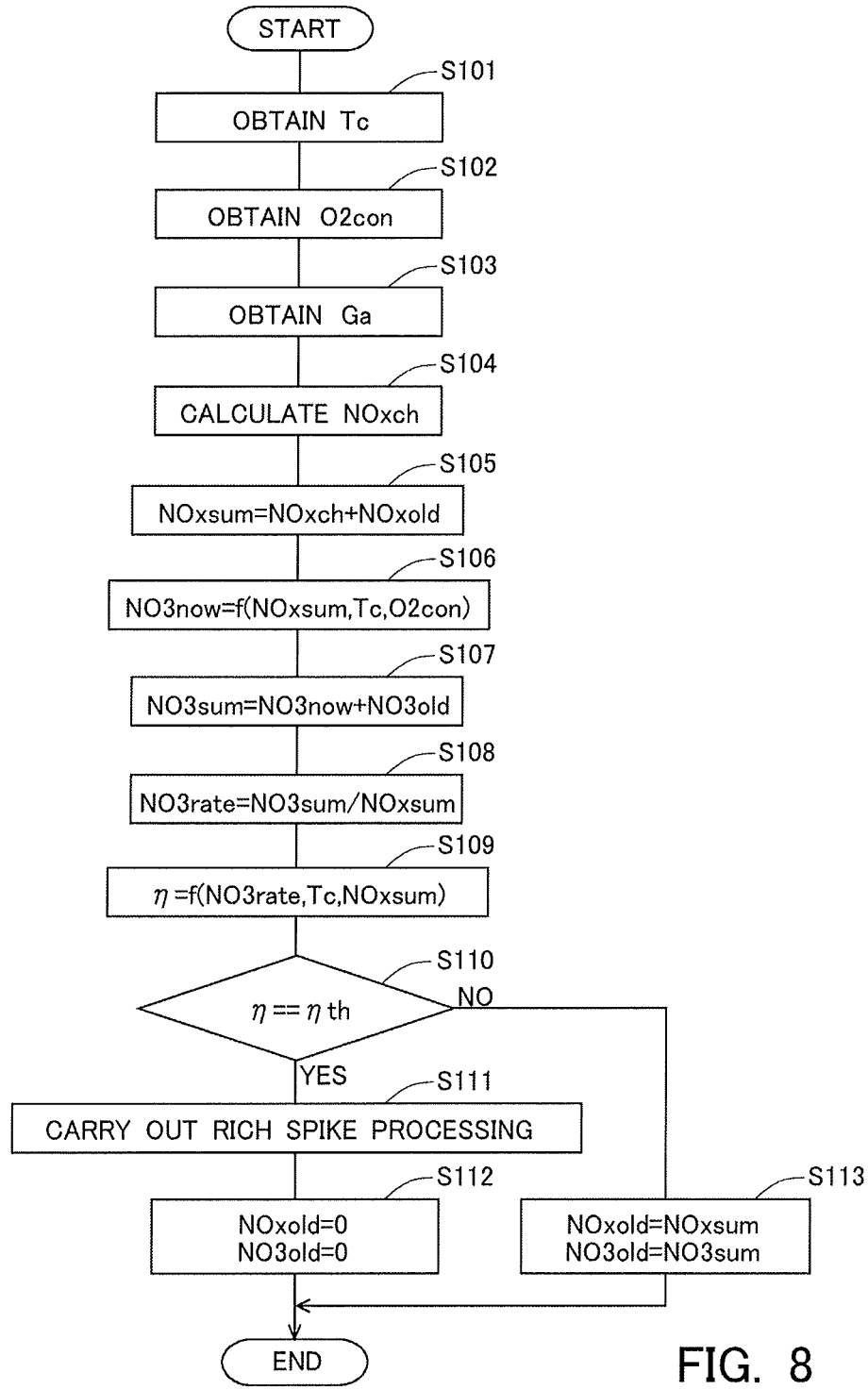
FIG. 8 is a flow chart indicating a control flow according to the first embodiment.

Next, reference will be made to a control flow or routine which is carried out in the exhaust gas purification apparatus for an internal combustion engine according to the present disclosure, based on FIG. 8. FIG. 8 is a flow chart indicating the control flow or routine according to this embodiment. In this embodiment, this routine is carried out at a predetermined operation interval or period Δt in a repeated manner by the ECU 10 during the operation of the internal combustion engine 1. Here, in the control routine indicated in FIG. 8, when the NOx reduction efficiency decreases to the reference efficiency ηth, the rich spike processing is carried out, as indicated in the above-mentioned FIG. 7. Here, note that when the rich spike processing is carried out, the NOx reduction efficiency becomes higher than the reference efficiency ηth, as indicated in the above-mentioned FIG. 7. For that reason, the control routine indicated in FIG. 8 will be carried out, when the NOx reduction efficiency is equal to or more than the reference efficiency ηth.

In this routine, first, in step S101, the catalyst temperature Tc is obtained. In step S101, the catalyst temperature Tc is calculated based on the output value of the temperature sensor 16.

Then, in step S102, the oxygen concentration O2con of the incoming exhaust gas is obtained. In step S102, the oxygen concentration O2con of the incoming exhaust gas is calculated based on the output value of the air fuel ratio sensor 14.

Subsequently, in step S103, the exhaust gas flow rate Ga is obtained. In step S103, the exhaust gas flow rate Ga is calculated based on the output value of the air flow meter 4.

Thereafter, in step S104, an amount of change NOxch of the NOx in the NSR catalyst 6 (hereinafter, sometimes also referred to simply as an "amount of change NOxch") until the present time after this routine was carried out last time is calculated. In step S104, the NOx incoming flow rate is calculated based on the exhaust gas flow rate Ga and the output value of the upstream side NOx sensor 13 obtained in step S103. In addition, the NOx outgoing flow rate is calculated based on the exhaust gas flow rate Ga and the output value of the downstream side NOx sensor 15. Moreover, the amount of change of the NOx in the NSR catalyst 6 per unit time is calculated by adding up the NOx incoming flow rate and the NOx outgoing flow rate. Then, the amount of change NOxch is calculated by multiplying the amount of change of the NOx per unit time by the operation period Δt.

Then, in step S105, the storage amount of NOx NOxsum is calculated. In step S105, the storage amount of NOx NOxsum is calculated by adding the amount of change NOxch calculated in step S104 to the last storage amount of NOx NOxold which is the last value of the storage amount of NOx NOxsum. Here, note that the value of the last storage amount of NOx NOxold is updated by the processing of step S112 or S113 which will be described later.

Thereafter, in step S106, an amount of production of nitrates NO3now (hereinafter, sometimes also referred to as a "current production amount") to be produced in a current state of the NSR catalyst 6 (the storage amount of NOx, the catalyst temperature and the oxygen concentration) is calculated. In step S106, a production rate of nitrates is calculated based on the storage amount of NOx NOxsum calculated in step S105, the catalyst temperature Tc obtained in step S101, and the oxygen concentration O2con of the incoming exhaust gas obtained in step S102. This production rate of nitrates is calculated by the following expression 1.

$$NO3reac = A \cdot \exp\left(-\frac{Ea}{R \cdot Tc}\right) \times NO2sum^a \times O2con^b \quad \text{Expression 1}$$

NO3reac: the production rate of nitrates,
Tc: the catalyst temperature,
NO2sum: the storage amount of nitrites,
O2con: the oxygen concentration,
R: a gas constant, and
A, Ea, a, b: empirical constants.

Then, the current production amount NO3now is calculated by multiplying the production rate of nitrates NO3reac by the operation period Δt.

Here, the storage amount of nitrites NO2sum is an amount of the nitrites stored in the NSR catalyst 6, and is calculated by the following expression 2.

NO2sum=(NOxold−NO3old)+NOxch  Expression 2,

NO2sum: the storage amount of nitrites,
NOxold: the last storage amount of NOx,
NO3old: the last storage amount of nitrates, and
NOxch: the amount of change.

In other words, the NOx having flowed into the NSR catalyst 6 can once turn into nitrites and can be stored into the NSR catalyst 6, so the change of NOx in the NSR catalyst 6 until the present time after this routine was carried out last time is all assumed to be the change of nitrites. Then, the storage amount of nitrites NO2sum is calculated by adding the last amount of nitrites (NOxold−NO3old) stored in the NSR catalyst 6 to the amount of change NOxch.

Subsequently, in step S107, the storage amount of nitrates NO3sum is calculated. In step S107, the storage amount of nitrates NO3sum is calculated by adding the current production amount NO3now calculated in step S106 to the last storage amount of nitrates NO3old which is the last value of the storage amount of nitrates NO3sum. Here, note that the value of the last storage amount of nitrates NO3old is updated by the processing of step S112 or S113 which will be described later.

Then, in step S108, the nitrate ratio NO3rate is calculated. In step S108, the nitrate ratio NO3rate is calculated by dividing the storage amount of nitrates NO3sum calculated in step S107 by the storage amount of NOx NOxsum calculated in step S105.

Thereafter, in step S109, the NOx reduction efficiency η (an estimated value of the NOx reduction rate in the case of carrying out the rich spike processing at the present point in time) is calculated. The ECU 10 calculates the NOx reduction efficiency η without depending on the execution of the rich spike processing. In step S109, the NOx reduction efficiency η is calculated based on the nitrate ratio NO3rate calculated in step S108, the catalyst temperature Tc obtained in step S101, and the storage amount of NOx NOxsum calculated in step S105. Specifically, the above-mentioned correlations as exemplified from FIG. 6A to FIG. 6C have been stored in a ROM of the ECU 10 in advance. In step S109, the NOx reduction efficiency η is calculated based on such correlations, the nitrate ratio NO3rate, the catalyst temperature Tc and the storage amount of NOx NOxsum as mentioned above.

Subsequently, in step S110, it is determined whether the NOx reduction efficiency η calculated in step S109 becomes the reference efficiency ηth. Here, the reference efficiency ηth has been decided in advance, and stored in the ROM of the ECU 10. Then, in cases where an affirmative determination is made in step S110, the routine of the ECU 10 goes to the processing of step S111, whereas in cases where a negative determination is made in step S110, the routine of the ECU 10 goes to the processing of step S113.

In cases where an affirmative determination is made in step S110, then in step S111, rich spike processing is carried out. Thus, when the rich spike processing is actually carried out before the NOx reduction efficiency η calculated without depending on the execution of the rich spike processing becomes lower than the reference efficiency ηth, the stored NOx becomes easy to be reduced by the execution of the rich spike processing, in comparison with the case when the NOx reduction efficiency η is lower than the reference efficiency ηth.

Thereafter, in step S112, the values of the last storage amount of NOx NOxold and the last storage amount of nitrates NO3old are updated to 0. In other words, in step S112, it is assumed that all the stored NOx is reduced by the execution of the rich spike processing. However, there is no intention to limit the disclosure to this, but the storage amount of NOx and the storage amount of nitrates after the execution of the rich spike processing (i.e., the last storage amount of NOx NOxold and the last storage amount of nitrates NO3old) may be calculated based on the NOx reduction efficiency η calculated in step S109. Then, after the processing of step S112, the execution of this routine is ended.

On the other hand, in cases where a negative determination is made in step S110, then, in step S113, the value of the last storage amount of NOx NOxold is updated to the value of the storage amount of NOx NOxsum calculated in step S105, and the value of the last storage amount of nitrates NO3old is updated to the value of the storage amount of nitrates NO3sum calculated in step S107. Then, after the processing of step S113, the execution of this routine is ended.

The ECU 10 can carry out the rich spike processing in an efficient manner by performing the above-mentioned control flow or routine.

Second Embodiment

Next, reference will be made to a second embodiment based on FIG. 9 through FIG. 11. Here, note that in this second embodiment, the detailed explanation of substantially the same construction and substantially the same control processing as in the above-mentioned first embodiment will be omitted.

In this second embodiment, in cases where the catalyst temperature falls within a predetermined temperature range, the ECU 10 carries out the rich spike processing when the storage amount of NOx reaches a reference amount. Here, the predetermined temperature range is, for example, the range which is equal to or higher than Tcth1 and equal to or lower than Tcth2, as indicated in the above-mentioned FIG. 6B. In addition, the reference amount is, for example, the reference amount NOxth1 indicated in the above-mentioned FIG. 6C.

However, as indicated in the above-mentioned FIG. 6A, the NOx reduction efficiency changes according to the nitrate ratio. Accordingly, when the execution timing of the rich spike processing is decided without taking the nitrate ratio into consideration, there is a fear that the stored NOx can not be reduced to a sufficient extent.

Thus, in this second embodiment, the ECU 10 carries out the rich spike processing by changing the reference amount in such a manner that the reference amount becomes smaller in the case where the nitrate ratio of is high than in the case where it is low. This will be explained below by using FIG. 9.

Figure 9:
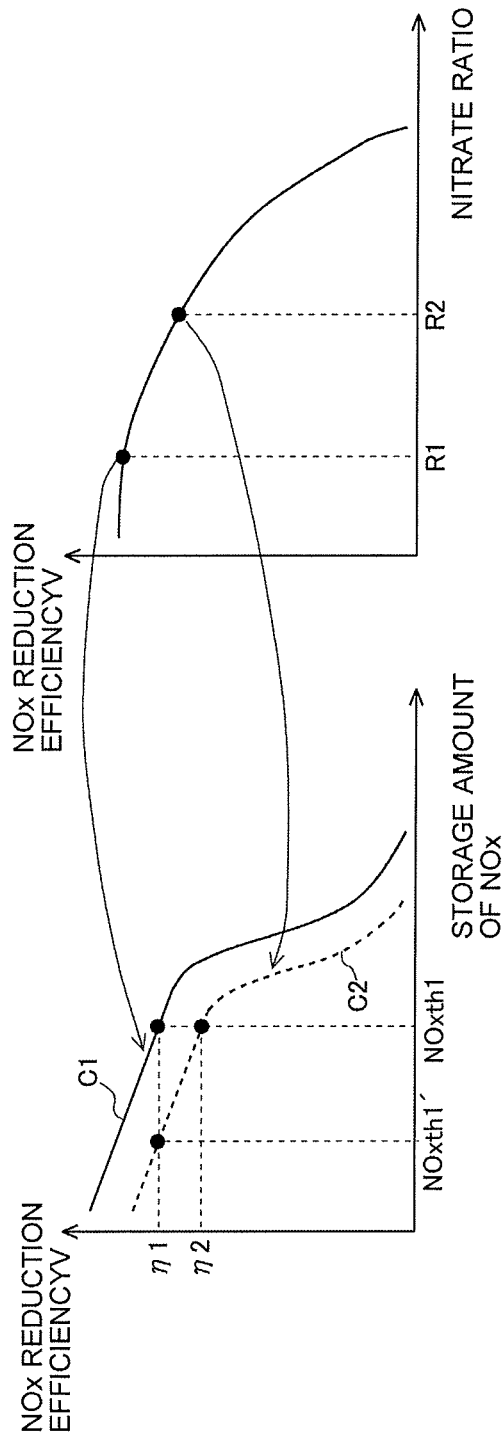
FIG. 9 is a view for explaining an example in which a reference amount is changed based on the nitrate ratio.

FIG. 9 is a view for explaining an example in which the reference amount is changed based on the nitrate ratio. In the example indicated in FIG. 9, a correlation between the storage amount of NOx and the NOx reduction efficiency at the time when the nitrate ratio is R1 is indicated by a line C1, and the correlation at the time when the nitrate ratio is R2 is indicated by a line C2. The NOx reduction efficiency changes according to the nitrate ratio, so that when the nitrate ratio changes, the correlation between the storage amount of NOx and the NOx reduction efficiency will also accordingly change.

Then, in order to reduce the stored NOx sufficiently by the execution of the rich spike processing, it is assumed that the NOx reduction efficiency is required to be η1 or more. In that case, in cases where the correlation between the storage amount of NOx and the NOx reduction efficiency is indicated by the line C1, the reference amount becomes NOxth1. On the other hand, in cases where the nitrate ratio has changed and the correlation between the storage amount of NOx and the NOx reduction efficiency has accordingly changed from the line C1 to the line C2, if the reference amount is set to NOxth1, the NOx reduction efficiency will become η2 which is lower than η1. Accordingly, in this case, in order to make the NOx reduction efficiency at the time of the execution of the rich spike processing equal to or more than η1, the reference amount is changed from NOxth1 to NOxth1'. With this, the rich spike processing can be carried out in an efficient manner.

Here, a control flow or routine according to this second embodiment will be explained. FIG. 10 is a flow chart indicating the control flow or routine according to this second embodiment. In this second embodiment, this routine is carried out at a predetermined operation interval or period Δt in a repeated manner by the ECU 10 during the operation of the internal combustion engine 1. Here, note that in respective processings indicated in FIG. 10, the same reference signs are attached to the substantially same processings as those indicated in the above-mentioned FIG. 8, and the detailed explanation thereof is omitted.

Figure 10:
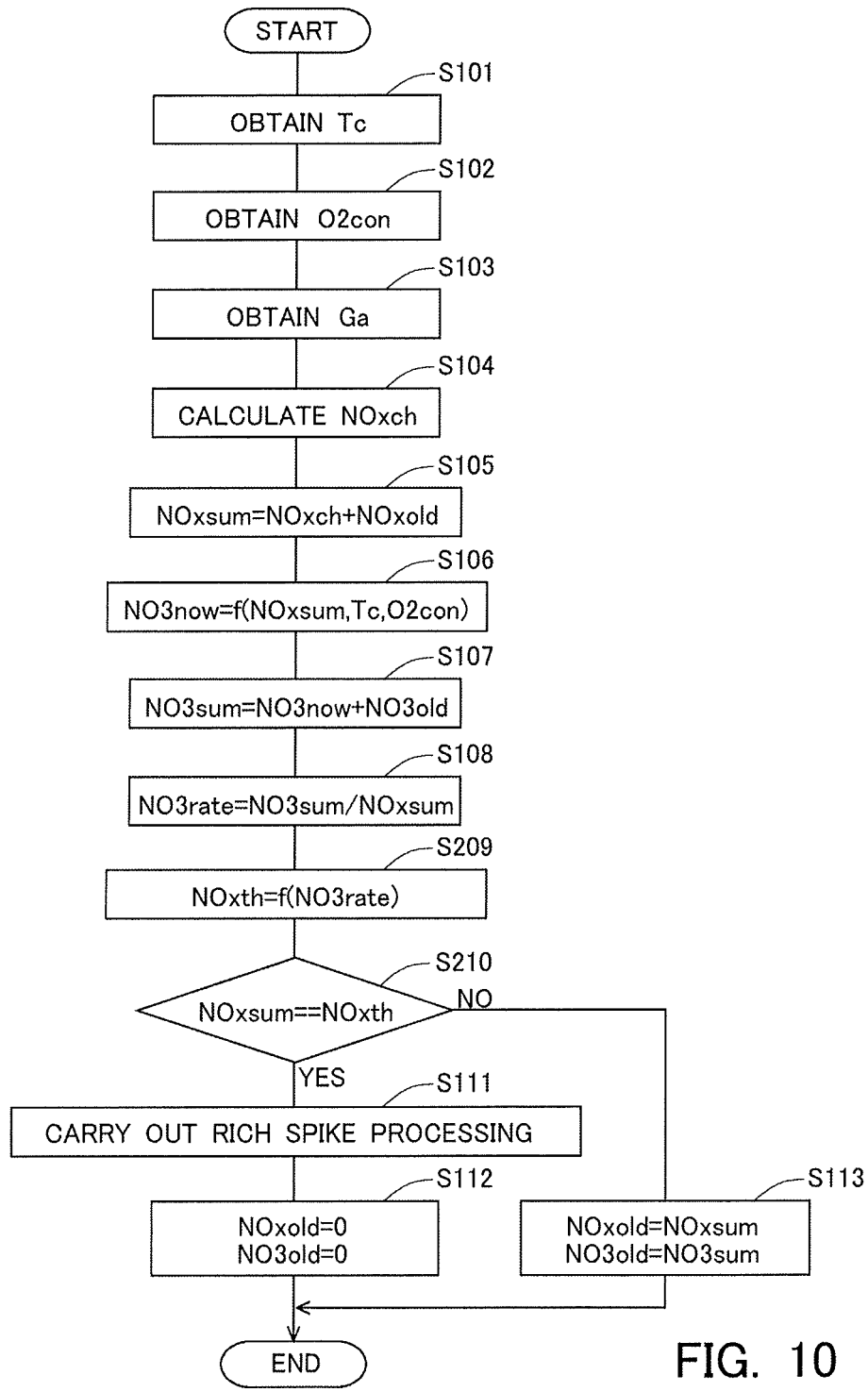
FIG. 10 is a flow chart indicating a control flow according to a second embodiment.

In the control routine indicated in FIG. 10, the reference amount NOxth is calculated in step S209, after the processing of step S108. Here, the correlation between the nitrate ratio NO3rate and the reference amount NOxth has been stored in advance in the ROM of the ECU 10 as a function or a map. In step S209, the reference amount NOxth is calculated based on this correlation and the nitrate ratio NO3rate calculated in step S108.

Subsequently, in step S210, it is determined whether the storage amount of NOx NOxsum calculated in step S105 becomes the reference amount NOxth calculated in step S209. Then, in cases where an affirmative determination is made in step S210, the routine of the ECU 10 goes to the processing of step S111, whereas in cases where a negative determination is made in step S210, the routine of the ECU 10 goes to the processing of step S113.

In this manner, in the above-mentioned control flow or routine, the reference amount NOxth is changed based on the nitrate ratio NO3rate (the processing in step S209), and the rich spike processing is carried out based on the reference amount NOxth thus changed (the processings in steps S210 and S111). Then, the ECU 10 can carry out the rich spike processing in an efficient manner by performing such a control flow or routine, too.

Figure 11:
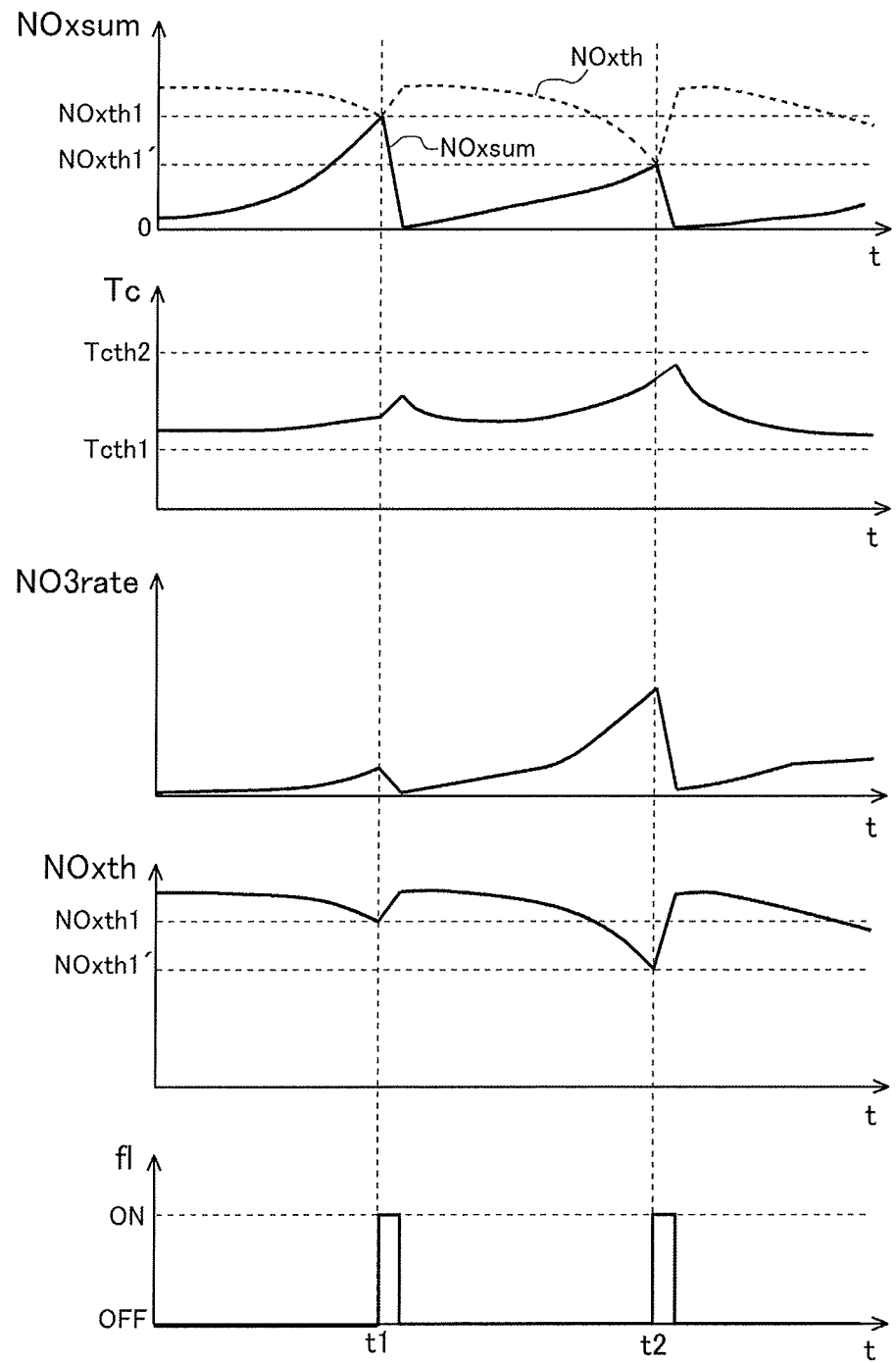
FIG. 11 is a time chart indicating the changes over time of a storage amount of NOx, a catalyst temperature, a nitrate ratio, a reference amount, and an execution flag according to the second embodiment.

Next, the above-mentioned control flow or routine will be briefly explained with the use of a time chart indicated in FIG. 11. FIG. 11 is a time chart indicating the changes over time of the storage amount of NOx NOxsum, the catalyst temperature Tc, the nitrate ratio NO3rate, the reference amount NOxth, and an execution flag fl.

As indicated in FIG. 11, in this second embodiment, the reference amount is changed according to the nitrate ratio. Specifically, the higher the nitrate ratio, the smaller the reference amount becomes. Then, at a time point t1 at which the storage amount of NOx and the reference amount become equal to each other at NOxth1, the rich spike processing is carried out (in the change over time of the storage amount of NOx indicated in FIG. 11, the change over time of the reference amount being also indicated as a reference by a broken line). In addition, at a time point t2 at which the storage amount of NOx and the reference amount become equal to each other at NOxth2, the rich spike processing is carried out. In this manner, in this second embodiment, the execution timing of the rich spike processing is advanced more in the case where the nitrate ratio is high than in the case where it is low. This makes it possible to carry out the rich spike processing in an efficient manner.

What is claimed is:

1. An exhaust gas purification apparatus for an internal combustion engine which performs lean burn operation, the apparatus comprising:
   an NOx storage reduction catalyst that is arranged in an exhaust passage of the internal combustion engine;
   a controller comprising at least one processor configured to carry out a rich spike to temporarily change an air fuel ratio of exhaust gas flowing into the NOx storage reduction catalyst from a lean air fuel ratio higher than a stoichiometric air fuel ratio into a rich air fuel ratio lower than the stoichiometric air fuel ratio; wherein
   the controller calculates a storage amount of NOx which is an amount of NOx stored in the NOx storage reduction catalyst, and a storage amount of nitrates which is an amount of nitrates stored in the NOx storage reduction catalyst, and further
   the controller calculates a nitrate ratio, which is a ratio of the storage amount of nitrates with respect to the storage amount of NOx, based on the storage amount of NOx and the storage amount of nitrates, and further the controller controls a timing at which the rich spike is carried out based on the nitrate ratio.

2. The exhaust gas purification apparatus for the internal combustion engine as set forth in claim 1, wherein
the controller calculates the storage amount of nitrates based on the storage amount of NOx, a temperature of the NOx storage reduction catalyst, and an oxygen concentration of the exhaust gas flowing into the NOx storage reduction catalyst.

3. The exhaust gas purification apparatus for the internal combustion engine as set forth in claim 1, wherein
the controller carries out the rich spike, when the storage amount of NOx reaches a predetermined reference amount, and
the controller changes the predetermined reference amount in such a manner that the predetermined reference amount becomes smaller when the nitrate ratio is high than when the nitrate ratio is low.

4. The exhaust gas purification apparatus for the internal combustion engine as set forth in claim 1, wherein
the controller further calculates an NOx reduction efficiency, which is a ratio of an amount of NOx reduced by the execution of the rich spike with respect to the storage amount of NOx before the execution of the rich spike, without depending on the execution of the rich spike, wherein
the controller calculates the NOx reduction efficiency based on the nitrate ratio, a temperature of the NOx storage reduction catalyst, and the storage amount of NOx, and
the controller calculates the NOx reduction efficiency in such a manner that the NOx reduction efficiency becomes lower as the nitrate ratio becomes higher, and that the NOx reduction efficiency becomes lower as the storage amount of NOx becomes larger, and that the NOx reduction efficiency becomes higher when the temperature of the NOx storage reduction catalyst falls within a predetermined temperature range than when the temperature does not fall within the range; and
the controller carries out the rich spike, before the NOx reduction efficiency becomes lower than a predetermined reference efficiency.

* * * * *